(12) United States Patent
Clark et al.

(10) Patent No.: US 11,798,003 B2
(45) Date of Patent: Oct. 24, 2023

(54) METHODS AND COMPUTER-READABLE MEDIA FOR FACILITATING FORENSIC INVESTIGATIONS OF ONLINE TRANSACTIONS

(71) Applicant: BCE INC., Verdun (CA)

(72) Inventors: David William Clark, Carp (CA); Stéphane Maxime François Fortier, Breakeyville (CA); Jean Bouchard, Sillery (CA)

(73) Assignee: BCE Inc., Verdun (CA)

( * ) Notice: Subject to any disclaimer, the term of this patent is extended or adjusted under 35 U.S.C. 154(b) by 503 days.

(21) Appl. No.: 15/990,225

(22) Filed: May 25, 2018

(65) Prior Publication Data

US 2018/0276675 A1    Sep. 27, 2018

Related U.S. Application Data

(63) Continuation of application No. 12/602,236, filed as application No. PCT/CA2007/002189 on Dec. 5, 2007, now abandoned.

(51) Int. Cl.
*G06Q 30/00* (2023.01)
*G06Q 20/40* (2012.01)
*G06Q 30/018* (2023.01)

(52) U.S. Cl.
CPC ........... *G06Q 30/00* (2013.01); *G06Q 20/403* (2013.01); *G06Q 30/0185* (2013.01)

(58) Field of Classification Search
None
See application file for complete search history.

(56) References Cited

PUBLICATIONS

Shuler, How Does the Internet Work? https://web.stanford.edu/class/msande91si/www-spr04/readings/week1/InternetWhitepaper.htm (Year: 2002).*

* cited by examiner

*Primary Examiner* — Aryan E Weisenfeld

(57) ABSTRACT

A method, comprising: receiving a first identifier associated with an online transaction and a second identifier used by end user equipment involved in the online transaction; obtaining evidentiary information pertaining to the end user equipment based on the second identifier; storing in a database a record that associates the first identifier with the evidentiary information; and retrieving one of (i) the evidentiary information in said record and (ii) the first identifier in response to a request identifying the other of (i) the evidentiary information in said record and (ii) the first identifier. Where the online transaction is effected over a network after the end user equipment has gained access thereto, the evidentiary information may include information pertaining to a subscriber whose credentials were used by the end user equipment to gain access to the network. The information pertaining to the subscriber may include personal information about the subscriber. Alternatively, the evidentiary information may include location information.

8 Claims, 8 Drawing Sheets

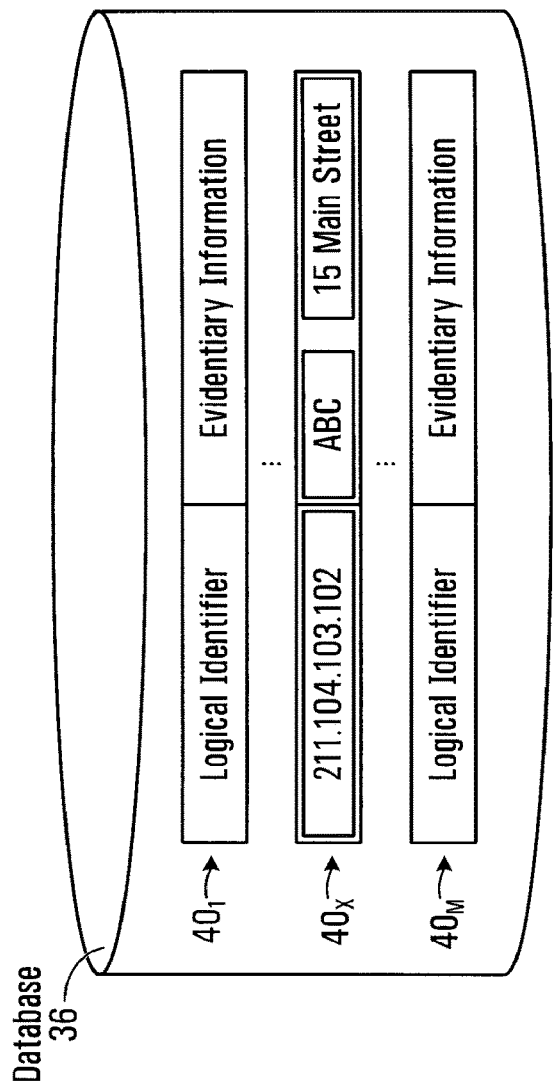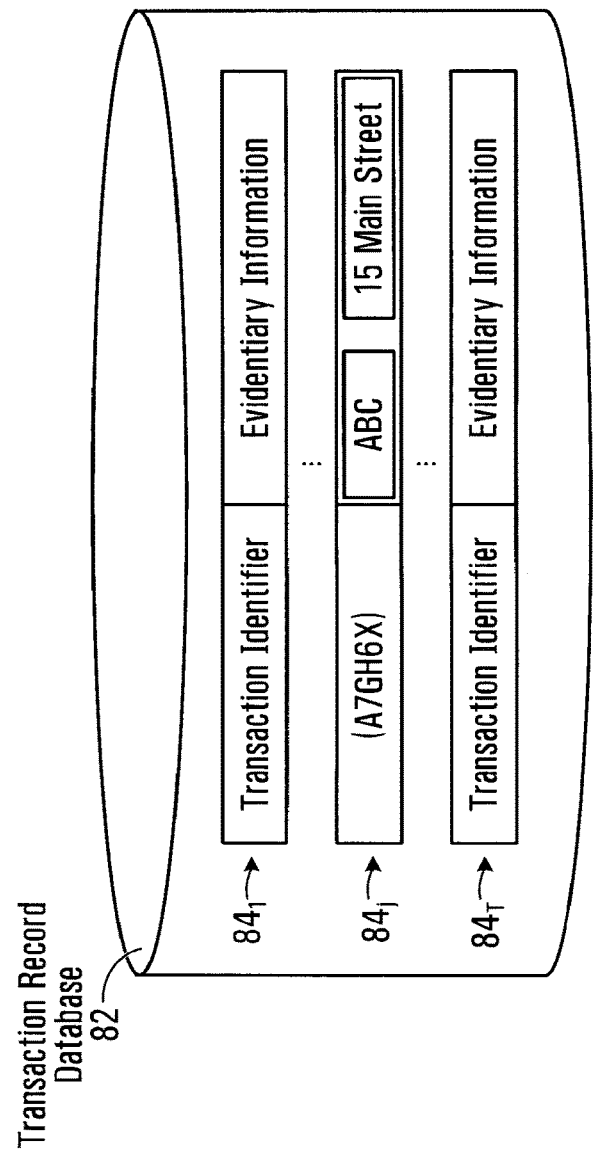

US 11,798,003 B2

METHODS AND COMPUTER-READABLE MEDIA FOR FACILITATING FORENSIC INVESTIGATIONS OF ONLINE TRANSACTIONS

FIELD OF THE INVENTION

The present invention relates generally to online transactions and, more particularly, to methods and computer-readable media for maintaining records of online transactions so as to facilitate forensic investigations of such transactions.

BACKGROUND

While most transactions conducted online are genuine, there is a certain amount of fraud involving online transactions, and the ensuing financial loss suffered by merchants continues to increase annually. Also, the distributed nature of the Internet tends to facilitate the availability of products or services whose procurement may in actual fact be illegal due to the purchaser's age, location or other attribute. While investigations into possible fraud or illegality of a conventional transaction are straightforward, the same cannot be said about online transactions where scarce data, if any, about the true individual who made the transaction remains traceable after the fact.

Against this background, there is a need in the industry for solutions for maintaining records of online transactions that will facilitate forensic investigations of those transactions.

SUMMARY OF THE INVENTION

According to a first broad aspect, the present invention seeks to provide a method, which comprises receiving a first identifier associated with an online transaction and a second identifier used by end user equipment involved in the online transaction; obtaining evidentiary information pertaining to the end user equipment based on the second identifier; storing in a database a record that associates the first identifier with the evidentiary information; and retrieving one of (i) the evidentiary information in said record and (ii) the first identifier in response to a request identifying the other of (i) the evidentiary information in said record and (ii) the first identifier.

According to a second broad aspect, the present invention seeks to provide a computer-readable medium comprising computer-readable program code which, when interpreted by a transaction management entity, causes the transaction management entity to execute a method. The computer-readable program code comprises first computer-readable program code for causing the transaction management entity to be attentive to receipt of a first identifier associated with an online transaction and a second identifier used by end user equipment involved in the online transaction; second computer-readable program code for causing the transaction management entity to obtain evidentiary information pertaining to the end user equipment based on the second identifier; third computer-readable program code for causing the transaction management entity to store in a database a record that associates the first identifier with the evidentiary information; and fourth computer-readable program code for causing the transaction management entity to retrieve one of (i) the evidentiary information in said record and (ii) the first identifier in response to a request identifying the other of (i) the evidentiary information in said record and (ii) the first identifier.

According to a third broad aspect, the present invention seeks to provide a system comprising: a transaction record database comprising a plurality of records, each of said records relating a respective first identifier associated with an online transaction to respective evidentiary information pertaining to end user equipment involved in the online transaction; and a transaction management entity configured to respond to a request identifying one of (i) a given first identifier associated with a given online transaction and (ii) evidentiary information related by one of said records to a given first identifier by retrieving the other of (i) the given first identifier and (ii) the evidentiary information related thereto.

According to a fourth broad aspect, the present invention seeks to provide a method of investigating an online transaction associated with a transaction identifier. The method comprises providing the transaction identifier to a transaction management entity; obtaining from the transaction management entity evidentiary information pertaining to the end user equipment involved in the online transaction associated with the transaction identifier; and comparing the evidentiary information to information associated with a transaction object used to effect the online transaction.

According to a fifth broad aspect, the present invention seeks to provide a method of identifying a suspect potentially responsible for effecting an online transaction associated with a transaction identifier. The method comprises providing the transaction identifier to a transaction management entity; obtaining from the transaction management entity evidentiary information pertaining to the end user equipment involved in the online transaction associated with the transaction identifier; and identifying as a suspect a party associated with the evidentiary information.

According to a sixth broad aspect, the present invention seeks to provide a network entity for participating in an online transaction taking place over a network. The network entity comprises a memory and a processing unit. The processing unit is configured to obtain a transaction identifier associated with an online transaction and a logical identifier associated with end user equipment involved in the online transaction; store in said memory a record that relates said transaction identifier to said logical identifier; and transmit said transaction identifier and said logical identifier over the network to an entity responsible for storing a relationship between the transaction identifier and evidentiary information pertaining to end user equipment involved in said online transaction.

These and other aspects of the invention will become apparent to those of ordinary skill in the art upon review of the following description of certain embodiments of the invention in conjunction with the accompanying drawings.

BRIEF DESCRIPTION OF THE DRAWINGS

A detailed description of embodiments of the present invention is provided herein below, by way of example only, with reference to the accompanying drawings, in which:

FIG. 2A shows possible contents of a database that stores information associated with various logical identifiers assigned to various end user equipment used to access the packet-switched network shown in FIG. 1.

FIG. 2B shows possible contents of a transaction record database that stores records for various transactions that have been attempted or effected by various subscribers.

It is to be expressly understood that the description and drawings are only for the purpose of illustration of certain embodiments of the invention and are an aid for understanding. They are not intended to be a definition of the limits of the invention.

DETAILED DESCRIPTION OF NON-LIMITING EMBODIMENTS

Figure 1:
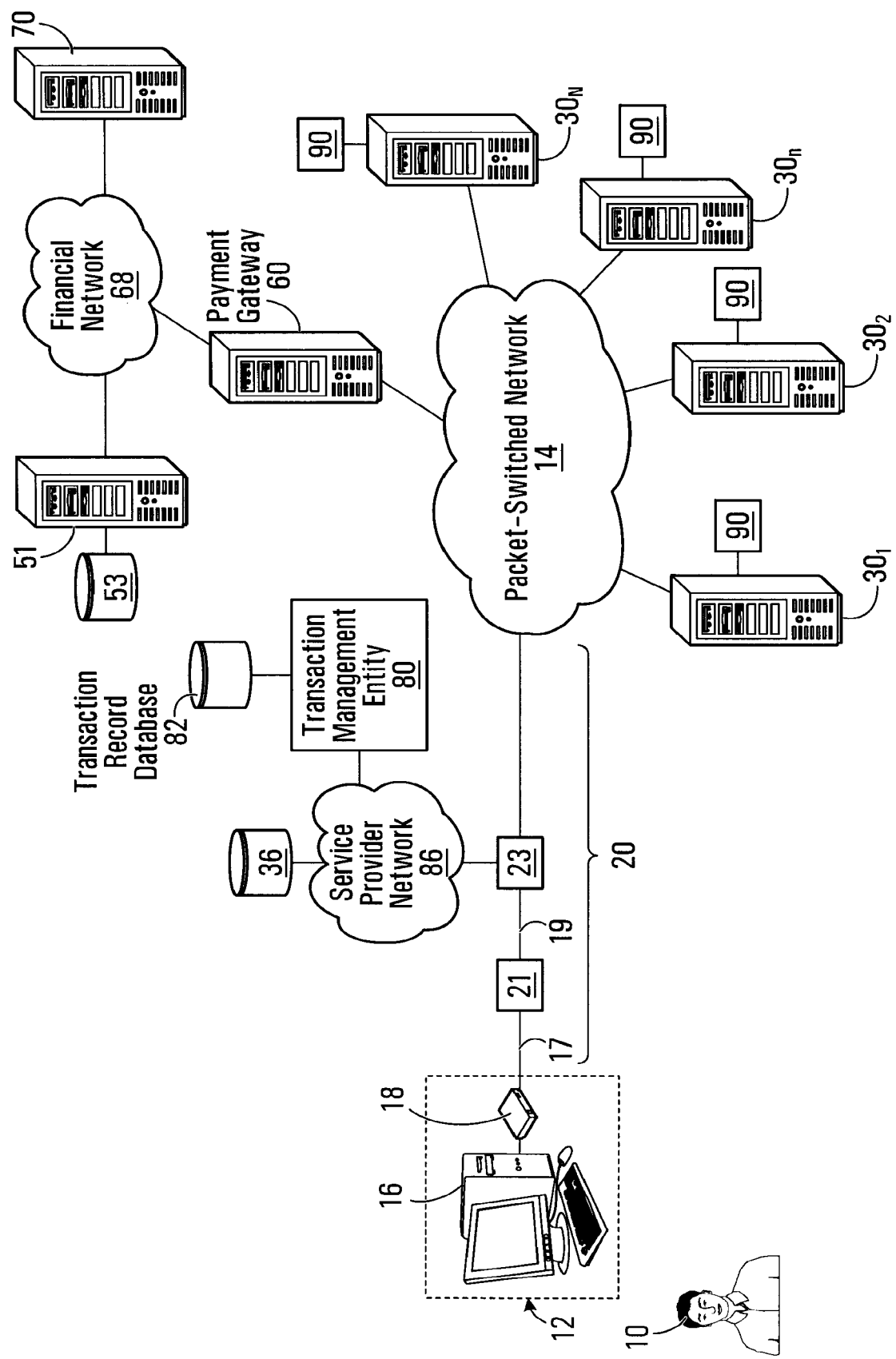
FIG. 1 shows an architecture allowing a user of end user equipment connected to a packet-switched network to access and interact with merchant sites of that network, for example, to make online transactions, in accordance with an embodiment of the present invention.

FIG. 1 depicts a packet-switched network 14 to which are connected a plurality of merchant sites implemented by a plurality of servers $30_1 \ldots 30_N$. Computing devices that gain access to the packet-switched network 14 can interact with the merchant sites in order to effect online transactions. In a non-limiting embodiment, the packet-switched network 14 is the Internet and the merchant sites are web sites.

Access to the packet-switched network 14 is controlled or managed by a service provider that has a number of subscribers. In various non-limiting embodiments, the service provider may be an Access Service Provider (ASP), a Regional Access Network Provider (RANP) or an Internet Service Provider (ISP). Individual subscribers are given permission to access the packet-switched network 14 when using certain authorized end user equipment and/or when providing certain authorized login credentials.

FIG. 1 shows one example of end user equipment 12 that may be used to access the packet-switched network 14 by a user 10. Specifically, the end user equipment 12 comprises a computing device 16 and a network interface unit 18. The computing device 16 may be implemented as a personal computer (PC), such as a desktop computer, a laptop computer or a tablet PC. The computing device 16 is provided with at least one input device such as a keyboard, a mouse, a touchscreen, a stylus, a microphone, etc., as well as a display and possibly one or more other output devices (e.g., speakers) that enable interaction with the user 10. The computing device 16 is operative to run a software application implementing a network browser (e.g., a web browser) with which the user 10 can interact via the display (and possibly the one or more other output devices) and the at least one input device in order to access and interact with merchant sites of the packet-switched network 14.

A communication link 20 is provided between the end user equipment 12 and the packet-switched network 14. The network interface unit 18 interfaces with the communication link 20 and enables the computing device 16 to exchange data with the packet-switched network 14 (and, ultimately, with the merchant sites). For example, depending on the nature of the communication link 20, the network interface unit 18 may be implemented as a modem such as a broadband modem (e.g., a digital subscriber line (DSL) modem or a cable modem) or a narrowband modem (e.g., a dial-up modem). In other embodiments, such as in the case of Fiber to the premises (FTTP), the network interface 18 may be implemented as an optical network termination (ONT)-based Ethernet connection. Although it is shown as being a separate component in FIG. 1, the network interface unit 18 may be integrated into the computing device 16 (e.g., it may be a card internal to the computing device 16).

The communication link 20 may traverse one or more network elements and comprise one or more physical links and one or more logical links. For example, the communication link 20 may comprise a physical link 17 between the network interface unit 18 and a network element 21. The physical link 17 may comprise a copper twisted pair, a coax cable, an Ethernet link, a fiber optic link (e.g., fiber to the premises (FTTP)), a fixed wireless link, a satellite link, or a combination thereof. Depending on the nature of the physical link 17, the network element 21 may be a DSL access multiplexer (DSLAM), a cable modem termination system (CMTS), or another type of network element. The communication link 20 may also comprise a dedicated logical link 19 between the network element 21 and another network element 23 that provides access to the packet-switched network 14. For instance, the network element 23 may be a network access server (NAS), a router, etc. It will be appreciated that the communication link 20 may take on other forms in other embodiments.

For the purposes of exchanging data with the packet-switched network 14, the end user equipment 12 may be assigned a logical identifier. In two non-limiting example embodiments, the logical identifier may be assigned to the computing device 16 or to the network interface unit 18. The logical identifier, which can be an Internet Protocol (IP) address (e.g., in compliance with IPv4 or IPv6) or a proprietary address, label or tag, can be assigned in a static or dynamic fashion. In the static case (e.g., a static IP address), the logical identifier does not change over time. In the dynamic case (e.g., a dynamic IP address), the logical identifier may change over time (e.g., a dynamic IP address).

Assignment of the logical identifier to the end user equipment 12 can be effected under control of the service provider and may be the responsibility of a designated network element that is part of the communication link 20, such as the network element 23 (particularly in embodiments where the network element 23 is a network access server). The designated network element may assign the logical identifier to the end user equipment 12 when the end user equipment 12 is activated (e.g., when the network interface unit 18 and/or the computing device 16 is/are powered-up) or otherwise regains network connectivity and/or at certain time intervals which may range from an hour or less to several months or more. For instance, in embodiments where the logical identifier is a dynamic IP address, the network element assigning the dynamic IP address to the end user equipment 12 may do so in accordance with the Dynamic Host Configuration Protocol (DHCP) using a pool of IP addresses accessible to that network element. It will be recognized that assignment of the logical identifier to the end user equipment 12 may be effected in different ways in different embodiments.

The service provider maintains a database 36 that stores information associated with the various logical identifiers assigned to various end user equipment used to access the packet-switched network 14. The database 36 can be linked to various components of the infrastructure of FIG. 6 in different ways. For example, in one embodiment, the database 36 may be integrated with the network element 23. In another embodiment, the database 36 may be connected to the network element 23 either directly or via a service provider network 86, for example. In still other embodiments, the database 36 may be distributed amongst a plurality of network elements and/or physical locations. Also, it should be appreciated that the database 36 may be managed, maintained and/or updated by an entity that may be the same entity as, or a different entity from, the service provider responsible for providing the end user equipment 12 with access to the packet-switched network 14.

With additional reference to FIG. 2A, there is shown an example of possible contents of the database 36. An example process by which the database 36 may be populated and maintained is described later on. For the time being, it is sufficient to consider that the database 36 stores a plurality of records $40_1 \ldots 40_M$ for respective logical identifiers assigned to various end user equipment being used to access the packet-switched data network 14. The record for a particular logical identifier contains "evidentiary information" pertaining to the end user equipment to which the particular logical identifier was assigned.

Evidentiary information can be viewed as information that can serve as evidence towards establishing who has attempted/effected an online transaction and/or where that online transaction was attempted/effected from. The value of evidentiary information can be high when investigating online transactions, particularly days or weeks after they have taken place. Such analysis may be commissioned by, inter alia, financial institutions (such as banks, credit card companies, etc.), as well as government bodies (such as law enforcement agencies, taxation departments, etc.).

The evidentiary information that can be contained in a given one of the records $40_1 \ldots 40_M$ is not particularly limited and may take on various forms, some of which are best illustrated by way of example.

Accordingly, a first example of evidentiary information that can be contained in the record for a given logical identifier includes information (such as name, age, gender, etc.) regarding a particular subscriber whose credentials were supplied via the end user equipment to which the given logical identifier was assigned, when access to the packet-switched network 14 was sought.

A second example of evidentiary information that can be contained in the record for a given logical identifier includes location information indicative of where the end user equipment to which the given logical identifier was assigned was located, when access to the packet-switched network 14 was sought. Such location information may specify a "service point" at which the end user equipment was determined to be located. The "service point" refers to a point where a network access service is provided to a subscriber by the service provider. By way of a specific non-limiting example, the service point may be a house or other building, or an area thereof. The location of the service point, which is hereinafter referred to as the "service point location", may be expressed as a geo location (latitude, longitude, elevation, and the datum which identifies the coordinate system used, such as, without limitation, the World Geodetic System 1984 (WGS841) datum). Alternatively or in addition, the service point location may be expressed as a civic location (a set of elements that describe detailed street address information). Still other possibilities exist and are within the scope of the invention.

Returning to FIG. 1, the servers $30_1 \ldots 30_N$ and the merchant sites that they implement are operated, managed or otherwise associated with various entities, including, for example, companies, governmental organizations, non-profit organizations, and individuals. Each of the servers $30_1 \ldots 30_N$ comprises suitable hardware, firmware, software, control logic, or a combination thereof for implementing a plurality of functional components, including an interface and a processing unit.

The interface of each of the servers $30_1 \ldots 30_N$ is adapted to receive messages from, and send messages to, communication equipment (such as the end user equipment 12) connected to the packet-switched network 14, as well as to receive data from, or send data to, other elements (e.g., computers or databases) communicatively coupled to that server but not necessarily connected to the packet-switched network 14.

The processing unit of each of the servers $30_1 \ldots 30_N$ is adapted to effect various processing operations to implement that server's functionality. For example, when the user 10 uses the end user equipment 12 to interact with a given merchant site implemented by a given one of the servers $30_1 \ldots 30_N$, this will typically involve the network browser implemented by the computing device 16 interacting with the given one of the servers $30_1 \ldots 30_N$ in order to allow the user 10 to view, hear or otherwise be exposed to content (e.g., web pages) of the given merchant site via the display and/or one or more other output devices of the computing device 16, and to input information (e.g., by entering text, selecting an option, etc.) and/or one or more commands (e.g., by clicking on a graphical button or a hyperlink) via the at least one input device of the computing device 16.

In accordance with an embodiment of the present invention, each of the servers $30_1 \ldots 30_N$ includes or has access to a corresponding memory 90. The memory 90 corresponding to a given one of the servers $30_1 \ldots 30_N$ stores an association between, on the one hand, logical identifiers used by various end user equipment to effect transactions with the given one of the servers $30_1 \ldots 30_N$ and, on the other hand, "transaction identifiers" for those transactions. The contents of the memory 90 corresponding to a given server are kept up to date as new transactions are effected with the given server.

A "transaction identifier" for a particular transaction may be generated by an entity involved in validating or otherwise processing the particular transaction. One example of such an entity includes a payment gateway 60.

The payment gateway 60 is a network element that is connected to a financial network 68 and that is used by one or more of the servers $30_1 \ldots 30_N$ to process online transactions attempted to be made via the merchant sites implemented by those one or more servers. The financial network 68 interconnects a plurality of servers or other computers associated with banks and/or other financial institutions. Examples of servers that could be interconnected via the financial network 68 include a transaction validation server 51 that could be associated with, for example, a card issuing bank and a server 70 that could be associated with, for example, an acquiring bank. It should be appreciated that in certain embodiments, the financial network 68 may be part of the packet-switched network 14, may comprise individual point-to-point links or may be dispensed with altogether.

The transaction validation server 51 may be connected to the various servers $30_1 \ldots 30_N$ (or computers associated with those servers) via respective communication paths established over the packet-switched network 14 and the financial network 68 and which may traverse one or more network elements such as gateways and other servers. The transaction validation server 51 is operated, managed or otherwise associated with an entity responsible for validating online transactions. In a specific non-limiting embodiment, this entity may be a card issuing bank that issues credit cards or debit cards.

The transaction validation server 51 comprises suitable hardware, firmware, software, control logic, or a combination thereof for implementing a plurality of functional components, including an interface and a processing unit. The interface of the transaction validation server 51 is adapted to receive messages from and send messages to other servers and/or other computers, and to exchange data with other elements (e.g., databases). The processing unit of the transaction validation server 51 is adapted to effect various processing operations to implement that server's functionality.

The transaction validation server 51 includes or has access to a database 53, which stores information used by the transaction validation server 51 to validate online transactions attempted to be effected by various users. Accordingly, the database 53 stores a plurality of records, each of which is associated with a respective "transaction object" and contains "transaction object information" pertaining to the respective transaction object, as well as ancillary information that may be required to process an online transaction attempted to be made using the respective transaction object. A "transaction object" refers to any physical or virtual object designed to be used in an attempt to make a transaction. For example, a transaction object may constitute a payment card (e.g., a credit card, a debit card, etc.), an account (e.g., a bank account, an online wallet account, login credentials for accessing secure content or a VPN, etc.), an electronic check, a set of one or more digital cash (electronic money) certificates, or any other physical or virtual object designed to be used in an attempt to make a transaction. The transaction object information can therefore take on various forms.

For example, the transaction object information may include payment card information regarding a payment card in situations where, for instance, the user 10 desires to purchase or otherwise obtain a product/service/content offered on a network site, pay a bill for a previously obtained product/service/content via the network site, or make a donation to a charity or other institution through the network site using the payment card. Such payment card information may be, for instance, credit card information regarding a credit card (e.g., a number, expiry date, and/or holder's name) or debit card information regarding a debit card (e.g., a number and/or holder's name). The payment card may comprise one or more card elements adapted to convey part or all of the payment card information, such as one or more sets of characters (e.g., printed and/or embossed characters), a magnetic stripe, and/or a chip (e.g., an EMV chip).

In another example, the transaction object information may include electronic check information regarding an electronic check (e.g., a check number and/or a checking account number) in situations where, for instance, the user 10 desires to effect a payment via a network site using the electronic check. In order to process the payment attempted to be effected by the user 10 using the electronic check, an entity (e.g., a bank or other financial institution, or the service provider) that allows the user 10 to use the electronic check may store on a computer-readable medium (e.g., as part of a database) information regarding the electronic check, including the electronic check information provided by the user 10.

In yet another example, the transaction object information may include digital cash information regarding a set of one or more digital cash certificates (e.g., digital cash certificate identifiers) in situations where, for instance, the user 10 desires to effect a payment via a network site using the set of one or more digital cash certificates. In order to process the payment attempted to be effected by the user 10 using the set of one or more digital cash certificates, an entity (e.g., a bank or other financial institution) that allows the user 10 to use the set of one or more digital cash certificates may store on a computer-readable medium (e.g., as part of a database) information regarding the set of one or more digital cash certificates, including the digital cash information provided by the user 10.

In a further example, the transaction object information may include account information regarding an account (e.g., an account number and/or holder's name and/or login credentials) in situations where, for instance, the user 10 desires to effect a transfer of funds to or from the account via a network site, or where the user 10 desires to access secure online content or a VPN via the network site. In order to process the attempted transfer or access, an entity (e.g., a bank or other financial institution, a corporate extranet server) that allows the user 10 to use the account may store on a computer-readable medium (e.g., as part of a database) information regarding the account, including the account information provided by the user 10.

The ancillary information contained in a particular record of the database 53 also depends on the nature of the transaction object associated with the particular record and can thus take on many forms. For example, where the transaction object associated with the particular record is a credit card, the ancillary information contained in the particular record may include a credit limit, a balance due, a billing address (i.e., an address where credit card bills are to be sent), a shipping address, a list of recent transactions, a list of one or more authorized transaction points (which could include the billing address and/or the shipping address), a list of one or more unauthorized transaction points, a spatio-temporal history of previous online transactions attempted using that credit card, a list of eligible card holders' names and/or possibly other information regarding the credit card.

In accordance with an embodiment of the present invention, the service provider maintains a transaction management entity 80 including or having access to a transaction record database 82. The transaction management entity 80 provides entities such as merchant sites, banks and credit card companies with a centralized point to which information regarding effected transactions can be sent. To this end, the transaction management entity 82 may be reachable via the packet-switched network 14 and the service provider network 86, or via a direct connection to one or more of the above entities. The contents of the transaction record database 82 are thus continuously updated based on information about transactions taking place in the packet-switched network 14, as received from a variety of sources.

With additional reference to FIG. 2B, there is shown an example of possible contents of the transaction record database 82. The transaction record database 82 stores a plurality of records $84_1 \ldots 84_T$ for various transactions that have been attempted/effected by various subscribers. The manner in which the transaction record database 82 is populated will be described later on in greater detail. Generally speaking, it can be said that a new record in the transaction record database 82 is created upon receipt of a transaction identifier and a logical identifier from an entity (such as a merchant site, bank or credit card company) having recorded an attempt to effect a transaction. The transaction identifier can be used to index the new record, while the logical identifier can be used to look up one or more elements of evidentiary information by consulting the database 36. The one or more elements of evidentiary information returned from the database 36 are stored in the record that has just been created in the transaction record database 82 for the transaction in question.

To illustrate more specifically how the transaction record database 82 may be populated, consider the situation where the user 10 decides to effect an online transaction with the merchant site implemented by the server $30_n$. For example, the user 10 may decide to: purchase or otherwise obtain a product and/or a service and/or content offered on the merchant site; pay a bill for a previously obtained product/service/content via the merchant site; transfer funds from one account to another via the merchant site; buy or sell securities (e.g., stocks, bonds, etc.) via the merchant site; make a donation to a charity or other institution through the merchant site; etc. It will be appreciated that various other situations may arise in which online transactions may be desired or may need to be effected.

For the purposes of the present example, it is assumed that the user 10 has used the end user equipment 12 to successfully gain access to the packet-switched network 14, and that the end user equipment 12 has been assigned a logical identifier, say 211.104.103.102. Successful access to the packet-switched network 14 may have been gained by the user 10 having provided the credentials of a legitimate subscriber, say, subscriber "ABC", via the end user equipment 12. Thus, with reference to FIG. 2A, the database 36 stores a record $40_X$ for logical identifier 211.104.103.102, which contains evidentiary information, such as the identity of subscriber "ABC" (or other personal information pertaining to subscriber "ABC"). Alternatively or in addition, the service provider determines a service point location (say, "15 Main Street") associated with the end user equipment 12 and stores this information in the record $40_X$. One way in which the service point location associated with the end user equipment 12 can be determined is described in greater detail later on.

In the course of attempting to effect an online transaction while interacting with the merchant site implemented by the server $30_n$, the user 10 provides transaction object information via the end user equipment 12. This can be done in various ways. For example, the user 10 may use one or more of the at least one input device of the computing device 16 to enter the transaction object information and cause this information to be sent by the end user equipment 12 to the server $30_n$ (or another computer associated with the server $30_n$) over the packet-switched network 14. Alternatively, the transaction object information may have been previously stored in the computing device 16, in which case the user 10 may use one or more of the at least one input device of the computing device 16 to cause the end user equipment 12 to send the previously stored transaction object information to the server $30_n$ (or another computer associated with the server $30_n$) over the packet-switched network 14.

For purposes of this example, the transaction object is a particular credit card, the transaction object information is credit card information regarding the particular credit card and the transaction validation server 51 is a server associated with a card issuing bank that issued the particular credit card. Also, for purposes of this example, each of the records in the database 53 is associated with a credit card and includes credit card information regarding that credit card. One of these records may be associated with the particular credit card and thus may include credit card information regarding the particular credit card.

The online transaction attempted to be effected by the user 10 may be subjected to various conventional security measures intended to protect information traveling to and from the end user equipment 12 over the packet-switched network 14. For example, the credit card information provided by the user 10 via the end user equipment 12 may be encrypted (e.g., using the Secure Socket Layer (SSL) protocol) prior to being sent over the packet-switched network 14. In other examples, card security code (CSC) verification may be employed whereby the user 10 is asked to enter the credit card's CSC, and/or address verification systems (AVS) may be employed whereby an address entered by the user 10 is compared to a billing address known to the credit card's issuing bank. Various other security measures may be employed in different cases.

Figure 3:
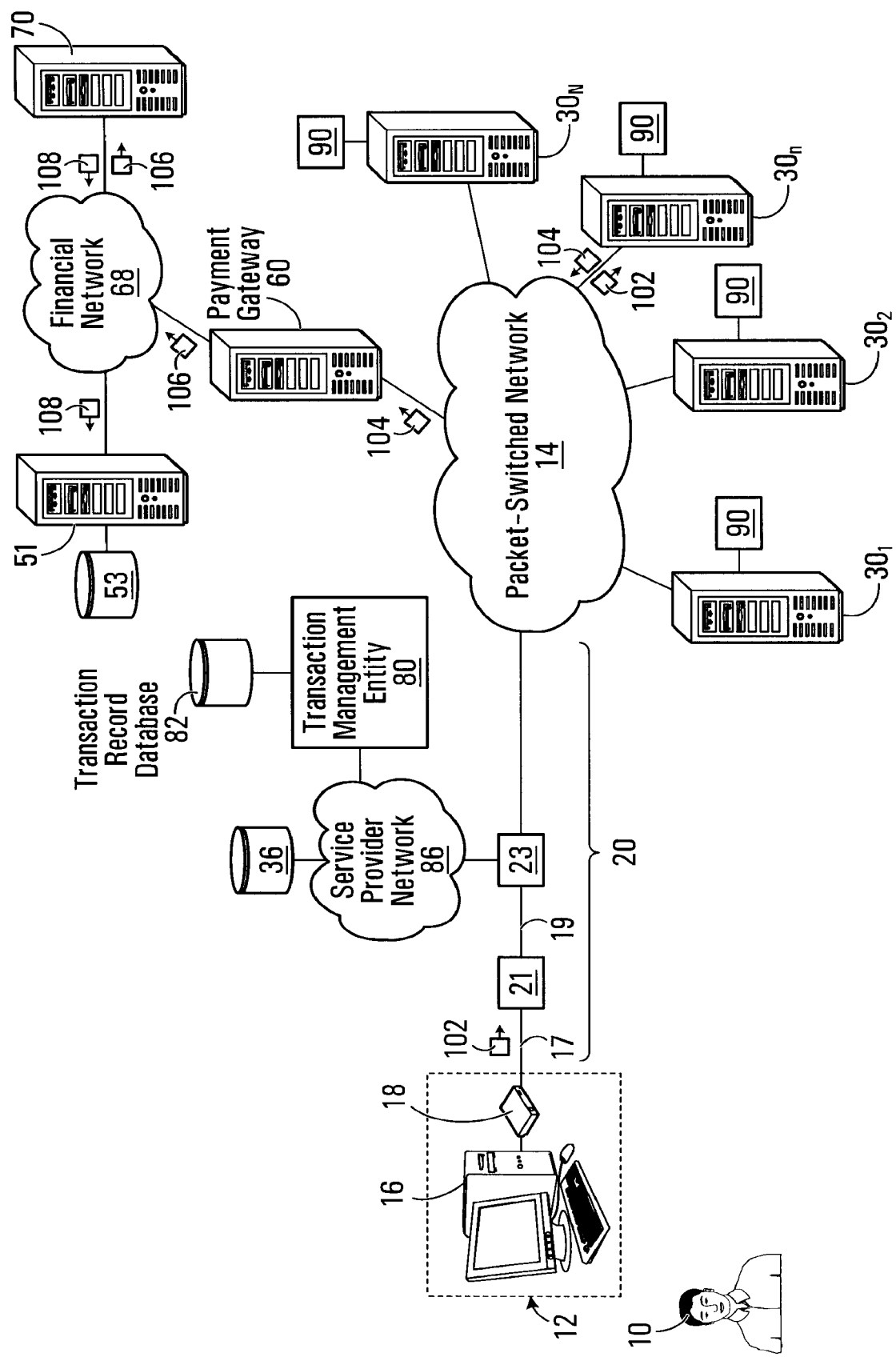
FIG. 3 shows an example of message flow in the architecture of FIG. 1, in the context of attempting a transaction.

With reference now to FIG. 3, the computing device 16 of the end user equipment 12 transmits to the server $30_n$ a message 102. In this example, the message 102 conveys: (i) order information indicative of the selected product/service/content; (ii) purchase amount information indicative of an amount to be paid to purchase the selected product/service/content; and (iii) the credit card information regarding the particular credit card. Alternatively, the order information, the purchase amount information and possibly even the credit card information may already be known to the server $30_n$ due to prior interaction between the computing device 16 and the server $30_n$. In such a case, the message 102 may simply convey an indication or confirmation of a desire of the user 10 to purchase the selected product/service/content.

Additionally, the message 102 may also convey the logical identifier assigned to the end user equipment 12, in this case 211.104.103.102. Alternatively, the logical identifier assigned to the end user equipment 12 may not be conveyed by the message 102 but may already be known to the server $30_n$ due to prior interaction between the computing device 16 and the server $30_n$.

The message 102 is received at the server $30_n$, which proceeds to send a message 104 to a payment gateway 60. In this example, the payment gateway 60 is used by the server $30_n$ to process online transactions attempted to be made via the merchant site implemented by the server $30_n$. Thus, the manner in which the payment gateway 60 can be reached may be known in advance to the server $30_n$. It is recalled that the financial network 68 interconnects the payment gateway 60 to the transaction validation server 51 (which is associated with the card issuing bank that issued the particular credit card) and the server 70 (which is associated with the acquiring bank used by the merchant that operates, manages or is otherwise associated with the server $30_n$).

The message 104 sent to the payment gateway 60 may be identical to the message 102, i.e., it may be a relayed version of the message 102 when the message 102 contains sufficient information. Alternatively, the message 104 may be generated by the server $30_n$ based on the message 102 and possibly other information known to the server $30_n$ (e.g., the order information, the purchase amount information and/or the credit card information). Ultimately, in this example, the message 104 conveys: (i) the purchase amount information indicative of an amount to be paid to purchase the selected product/service/content; and (ii) the credit card information regarding the particular credit card.

The message 104 is received at the payment gateway 60 which, in accordance with a specific non-limiting embodiment of the present invention, proceeds to generate a unique transaction identifier for the particular transaction being attempted. By way of specific non-limiting example, let the transaction identifier be A7GH6X. Also, having determined that the message 104 originates from the server $30_n$, the payment gateway 60 proceeds to send a message 106 over the financial network 68 to the server 70 (which, it is recalled, is associated with the acquiring bank used by the merchant associated with the server $30_n$). The message 106, which can be viewed as a request for transaction authorization, is intended to elicit from the financial network 68 a response as to whether the transaction identified by the transaction identifier A7GH6X is approved or denied. In this example, the payment gateway 60 generates the message 106 based on the message 104 such that the message 106 conveys: (i) the purchase amount information indicative of an amount to be paid to purchase the selected product/service/content; and (ii) the credit card information regarding the particular credit card. The transaction identifier A7GH6X may also be provided to facilitate processing.

The server 70 receives the message 106 and processes it to gain knowledge that an attempt is being made to effect a transaction having the transaction identifier A7GH6X and involving the merchant associated with the server $30_n$. Based on the credit card information conveyed by the message 106, the server 70 proceeds to send a message 108 to the transaction validation server 51 over the financial network 68. The message 108 may be identical to the message 106, i.e., it may be a relayed version of the message 106. Alternatively, the message 108 may be generated by the server 70 based on the message 106 and possibly other information known to the server 70. In this example, the message 108 conveys: (i) the purchase amount information indicative of an amount to be paid to purchase the selected product/service/content; and (ii) the credit card information regarding the particular credit card. The transaction identifier A7GH6X may also be provided to facilitate processing.

The message 108 is received at the transaction validation server 51, which is associated with the card issuing bank that issued the particular credit card that has been used by the user 10 to attempt to purchase the selected product/service/content. The transaction validation server 51 proceeds to process the message 108 to determine whether the transaction identified by the transaction identifier A7GH6X is to be approved or denied. To this end, the transaction validation server 51 consults the database 53 to identify a particular one of the records therein for the credit card information conveyed by the message 108.

The transaction validation server 51 may perform various processing operations to determine whether the transaction identified by the transaction identifier A7GH6X is to be approved or denied. For example, based on the ancillary information (e.g., a credit limit, a balance due, etc.) included in the particular one of the records in the database 53 and the purchase amount information conveyed by the message 108, the transaction validation server 51 may determine whether the transaction identified by the transaction identifier A7GH6X is to be approved or denied. It will be appreciated that approval or denial of the transaction identified by the transaction identifier A7GH6X may be determined by the transaction validation server 51 based on other factors in addition to or instead of those mentioned above.

Figure 4:
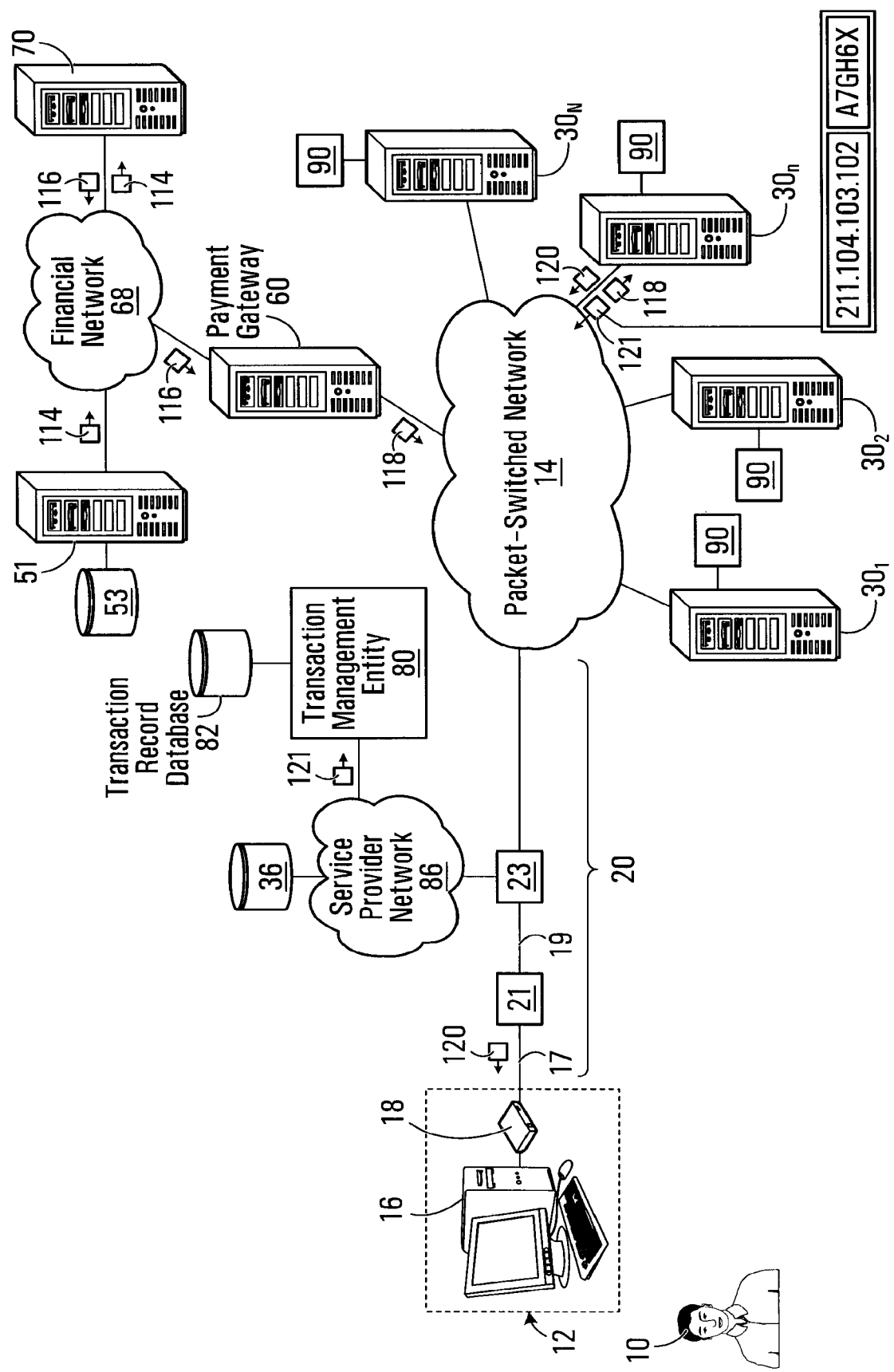
FIG. 4 shows an example of message flow following FIG. 3 once the transaction has been approved or denied, including an example flow of a message sent to a transaction management entity for further processing.

With reference now to FIG. 4, upon determining whether the transaction identified by the transaction identifier A7GH6X is approved or denied, the transaction validation server 51 returns a message 114 to the server 70 over the financial network 68. The message 114 indicates whether the transaction identified by the transaction identifier A7GH6X was approved or denied.

If the transaction identified by the transaction identifier A7GH6X was denied, the message 114 may indicate (e.g., by a code) a reason for this denial, such as insufficient funds, an unavailable bank link, etc. Depending on the circumstances, the transaction validation server 51 may also take further action, such as freezing a credit account corresponding to the particular credit card, informing security/law enforcement authorities, etc.

On the other hand, if the transaction identified by the transaction identifier A7GH6X was approved, the transaction validation server 51 may update, in the database 53, the record associated with the particular credit card to take into account approval of this transaction. For example, one or more elements of ancillary information (e.g., a balance due, an available credit, etc.) included in the record in question may be updated to reflect the fact that the transaction identified by the transaction identifier A7GH6X was approved.

The server 70 receives the message 114, and processes it to determine whether the transaction identified by the transaction identifier A7GH6X was approved or denied. If approved, the transaction identified by the transaction identifier A7GH6X is eventually settled via a settlement process involving the acquiring bank and the card issuing bank. This settlement process is well known and thus not described herein. Meanwhile, the server 70 proceeds to return a message 116 to the payment gateway 60. The message 116 may be identical to the message 114, i.e., it may be a relayed version of the message 114. Alternatively, the message 116 may be generated by the server 70 based on the message 114. The message 116 indicates whether the transaction identified by the transaction identifier A7GH6X was approved or denied and, if denied, may indicate a reason therefor.

The message 116 is received at the payment gateway 60, which proceeds to send a message 118 to the server $30_n$. The message 118 indicates whether the transaction identified by the transaction identifier A7GH6X was approved or denied and, if denied, may indicate a reason therefor. The information conveyed by the message 118 issued by the payment gateway includes the transaction identifier A7GH6X.

The server $30_n$ receives the message 118, including the transaction identifier A7GH6X. The server $30_n$ processes the message 118 to ascertain whether the transaction identified by the transaction identifier A7GH6X was approved or denied. Approval or denial (and a reason for denial, if applicable) may be recorded by the server $30_n$ for future reference. The server $30_n$ proceeds to send a message 120 to the computing device 16 of the end user equipment 12 in order to communicate approval or denial of the online transaction to the user 10.

Upon receiving the message 120, the computing device 16 processes the message 120 so as to communicate approval or denial of the online transaction to the user 10. For example, this may be achieved by displaying a "transaction approved" or "transaction denied" message (or any conceivable variant thereof) on the display of the computing device 16.

In addition, the server $30_n$ stores the transaction identifier received with the message 118 (in this case A7GH6X) in association with the logical identifier assigned to the end user equipment 12 used to effect the transaction in question (in this case 211.104.103.102). This can be done by creating a record in the memory 90. The stored association between the transaction identifier A7GH6X and the logical identifier 211.104.103.102 may prove valuable when it comes to launching a possible investigation into potential fraudulence of illegality of the transaction identified by the transaction identifier A7GH6X.

In addition, the server $30_n$ generates a message 121 that is sent to the transaction management entity 80. The message 121 can be sent to the transaction management entity 80 over the packet-switched network 14 or over a dedicated link, for example. The message 121 contains the aforementioned information that was stored in the memory 90 of the server $30_n$, namely (i) the transaction identifier A7GH6X for the transaction in question and (ii) the logical identifier 211.104.103.102 assigned to the end user equipment 12 that was used to effect the transaction in question. As an option, once the message 121 is sent to the transaction management entity 80, the association between the transaction identifier A7GH6X and the logical identifier 211.104.103.102 need no longer be maintained in the memory 90 of the server $30_n$.

The transaction management entity 80 is attentive to receipt of the message 121, upon receipt of which the transaction management entity 80 extracts therefrom the transaction identifier A7GH6X and the logical identifier 211.104.103.102. The transaction management entity 80 then queries the database 36 on the basis of the received logical identifier 211.104.103.102 to obtain evidentiary information contained in the record associated with the logical identifier 211.104.103.102.

It is recalled that the evidentiary information may take on various forms, such as a subscriber identity or other personal information and/or a service point location, to name a few non-limiting possibilities. In the non-limiting example being considered here, record $40_X$ in the database 36, which is associated with the logical identifier 211.104.103.102, stores the identity of subscriber "ABC" and the service point location "15 Main Street". The transaction management entity 80 then creates a new record $84_j$ in the transaction record database 82, which relates the transaction identifier A7GH6X received from the server $30_n$ to the evidentiary information (the identity of subscriber "ABC" and the service point location "15 Main Street") received from the database 36.

The records $84_1 \ldots 84_T$ in the transaction record database 82 (including the record $84_j$) thus relate timely obtained evidentiary information to transaction identifiers. The evidentiary information can then be provided at some later time to an interested party in response to an eventual request from the latter specifying a particular one of these transaction identifiers.

Several applications of the transaction record database 82 are now described. Firstly, consider the scenario where, at the time when a transaction (such as the aforesaid transaction identified by the transaction identifier A7GH6X) is effected, the service provider does not necessarily have an indication of whether this transaction is fraudulent or illegal. However, at some later time, let it be assumed that an interested party adopts a more suspicious view, based on its own research, customer complaints, a fraud detection mechanism, etc. The interested party may then undertake a forensic investigation regarding a "transaction of interest" associated with a particular transaction identifier.

Figure 5:
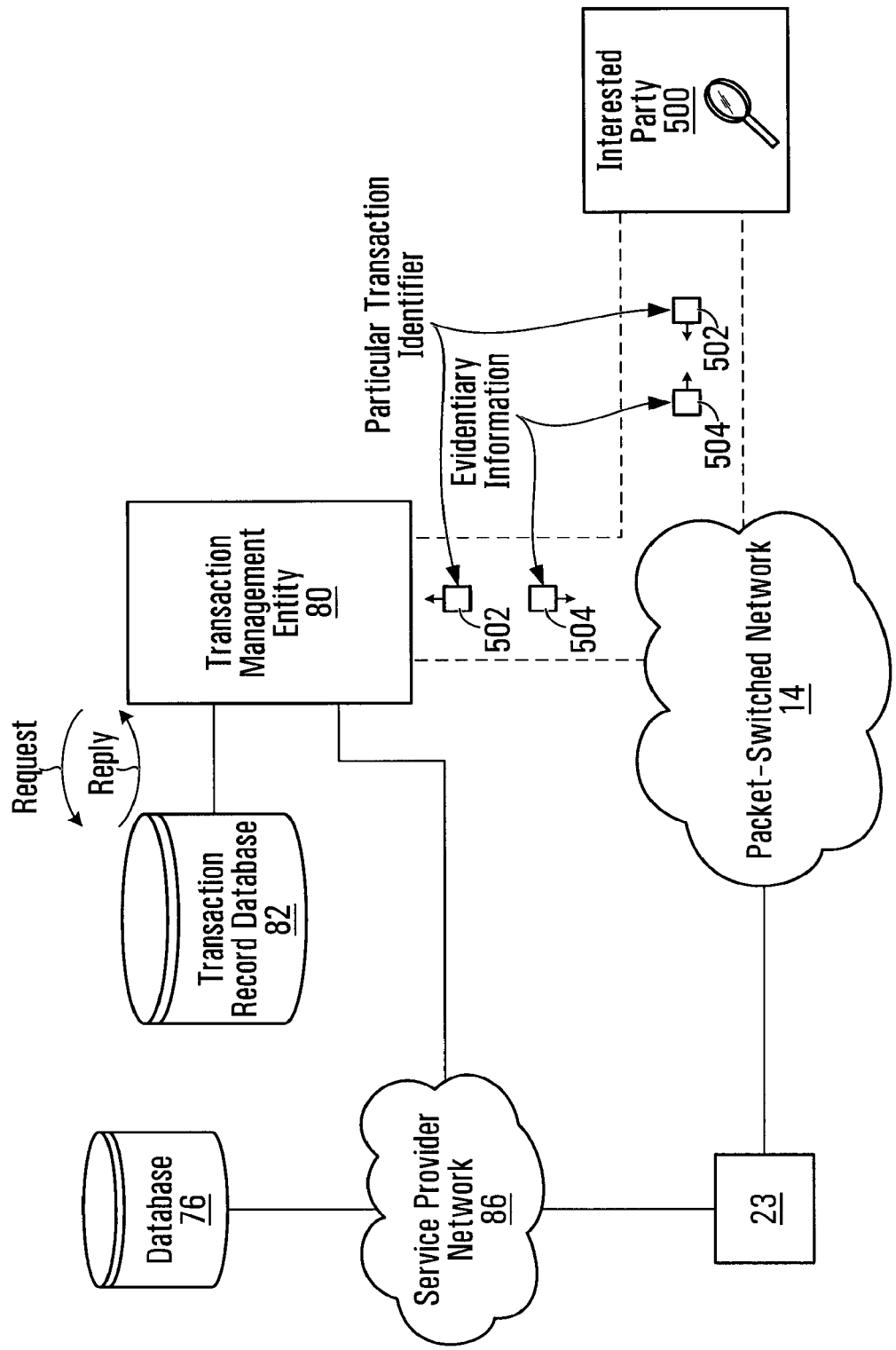
FIG. 5 shows an example of message flow during a forensic investigation of a transaction of interest.

With reference now to FIG. 5, the investigation proceeds with an interested party 500 (such as a merchant, a bank, a credit card company, a law enforcement agency, a governmental body, etc.) identifying the particular transaction identifier associated with the transaction of interest. To this end, the interested party 500 may send a message 502 to the transaction management entity 80 specifying the particular transaction identifier. The message 502 may reach the transaction management entity 80 via the packet-switched network 14 and the service provider network 86. Alternatively, the message 502 may reach the transaction management entity 80 via a direct link from the interested party 500. The transaction management entity 80 consults the transaction record database 82 in an attempt to match the particular transaction identifier with the transaction identifier stored in one of the records $84_1 \ldots 84_T$. If a match is not found, then the service provider has not stored a record of this transaction having taken place, and the interested party may wish to query other service providers who may have provided a conduit for the transaction of interest.

Assuming however that a matching record is identified, the corresponding evidentiary information (or a portion thereof) is retrieved from the transaction record database 82 and provided to the interested party in the form of a message 504. The level of detail provided in the message 504 could vary depending on the relationship between the interested party and the service provider. Thus, it is within the scope of the present invention to allow a law enforcement agency to be privy to a greater amount of detail concerning the evidentiary information than a credit card company.

In one embodiment, where the transaction of interest is known to be fraudulent (e.g., a fraudulent purchase, login, etc.), the evidentiary information may reveal to the interested party certain details about the culprit. For example, when the evidentiary information provided in the message 504 comprises a service point location, then the interested party may conclude where the fraudulent transaction of interest was made from. In another example, when the evidentiary information provided in the message 504 comprises the identity of a particular subscriber, then the interested party may conclude who is guilty of having effected the transaction of interest. Other example scenarios are of course possible, and each may lead to specific actions that may be taken by the interested party to identify and then pursue and/or prosecute the culprit, as will be appreciated by those skilled in the art.

In another embodiment, the evidentiary information may reveal to the interested party that the transaction of interest has a likelihood of having been illegal or fraudulent. For example, when the evidentiary information provided in the message 504 comprises a service point location, and if the particular credit card is authorized to be at any of a limited set of locations which do not include the service point location provided in the message 504, the interested party may conclude that the transaction of interest was fraudulent. In another example, when the evidentiary information provided in the message 504 comprises the identity of a particular subscriber, and if the particular subscriber is found to be or is registered as being of a certain age, the interested party may conclude that the transaction of interest was illegal. Other example scenarios are of course possible, and each may lead to specific actions that may be taken by the interested party to further investigate the issue of fraud, as will be appreciated by those skilled in the art.

In a second scenario for using the transaction record database 82, rather than contain the particular transaction identifier, the message 502 may contain target evidentiary information, such as a specific user or a specific location. Upon receipt of the message 502, the transaction management entity 80 consults the transaction record database 82 in an attempt to match the target evidentiary information with the evidentiary information stored in one or more of the records $84_1 \ldots 84_T$. Assuming that a matching record is identified, the corresponding transaction identifier(s) is(are)

retrieved from the transaction record database 82 and provided to the interested party in the form of the message 504. In the case where a particular suspect has been identified, for example, this application of an embodiment of the present invention allows the interested party to access transaction identifiers pertaining to all the transactions having been effected by that suspect (or from a specific location associated with that suspect). These transaction identifiers can be related to the actual transactions and analyzed for fraudulent activity in order to help establish the innocence or guilt of the suspect.

In a third scenario for using the transaction record database 82, consider the case where an interested party wishes to be notified when online transactions are attempted by a specific user or from a specific location (e.g., from a prison with Internet access). In one embodiment, in a provisioning phase, the transaction management entity 80 receives a request containing "evidentiary information of interest". Then, at the time when a transaction (such as the aforesaid transaction identified by the transaction identifier A7GH6X) is effected, the transaction management entity 80 checks the evidentiary information against the target evidentiary information and, if there is a match, the interested party can be alerted by sending the corresponding transaction identifier. The interested party then relates the transaction identifier to the transaction and establishes legitimacy/legality of the transaction.

In the scenarios considered above, the transaction identifier A7GH6X was generated by the payment gateway 60 upon receipt of the message 104, and was relayed to the server $30_n$ as part of the message 118. However, it should be appreciated that in various alternative embodiments, the transaction identifier A7GH6X may have been generated by the payment gateway 60 later on in the transaction validation, such as upon receipt of the message 116 from the server 70. Also, the transaction identifier A7GH6X could have been generated by other network entities involved in processing of the transaction and at various instances, such as:

by the server 70 upon receipt of message 106 from the payment gateway 60;

by the transaction validation server 51 upon receipt of the message 108 from the server 70;

by the server 70 upon receipt of the message 114 from the transaction validation server 51;

by the server $30_n$ upon originally receiving the message 102 from the computing device 16; or by a shipping agent that produces a waybill.

Still other possibilities are within the scope of the present invention.

It should also be appreciated that although the payment gateway 60, the server 70, the transaction validation server 51 and the server $30_n$ have been described as separate entities, this has been done for convenience and illustration only. It should therefore be understood that in certain embodiments, any one or more of the payment gateway 60, the server 70, the transaction validation server 51 and the server $30_n$ may be integrated into a single network entity or component.

In the scenarios considered above, the relationship between the transaction identifier A7GH6X and the logical identifier 211.104.103.102 was maintained by the server $30_n$ in its memory 90 and then was sent to the transaction management entity 80. However, it should be appreciated that in various alternative embodiments, this relationship may be maintained by other entities of interest prior to being sent to the transaction management entity 80, such as:

by the payment gateway 60 (in which case the message 104 sent from the server $30_n$ to the payment gateway 60 can be modified to inform the payment gateway of the logical identifier 211.104.103.102);

by the server 70 (in which case both the message 104, as well as the message 106 sent from the payment gateway 60 to the server 70, can be modified to inform the server 70 of the logical identifier 211.104.103.102); or by the transaction server 51 (in which case the messages 104 and 106, as well as the message 108, can be modified to inform the transaction server of the logical identifier 211.104.103.102).

Still other possibilities are within the scope of the present invention.

In the scenarios considered above, the transaction identifier A7GH6X and the logical identifier 211.104.103.102 were sent to the transaction management entity 80, which then obtained evidentiary information from the database 36 based on the received logical identifier 211.104.103.102. The resultant relationship between the transaction identifier A7GH6X and the retrieved evidentiary information was then stored in the record $84_j$ of the transaction record database 82. However, it should be appreciated that in various alternative embodiments, this relationship may be maintained by other entities of interest, such as by a third party (e.g., a law enforcement agency's Internet server) reachable via the packet-switched network 14. For example, the transaction management entity 80 may transmit the retrieved evidentiary information along with the corresponding transaction identifier A7GH6X to the law enforcement agency's Internet server for storage thereon.

As has been mentioned above, the evidentiary information that can be contained in the record for a given logical identifier may include location information indicative of where the end user equipment to which the given logical identifier was assigned was located when access to the packet-switched network 14 was sought. An example process by which the database 36 may be populated with such location information will now be described with reference to FIG. 6. Specifically, this example description will illustrate one possible manner by which an association between the logical identifier assigned to the end user equipment 12 and the location of a service point where the end user equipment 12 is located (e.g., "15 Main Street"), may be stored in the database 36 as part of one of the records $40_1 \ldots 40_M$.

In this example, the network element 21 of the communication link 20 connecting the end user equipment 12 to the packet-switched network 14 is an access multiplexer. In one embodiment, the access multiplexer 21 may be a DSLAM. The access multiplexer 21 is connected to the network element 23, which, in this embodiment, is a network access server (NAS). The NAS 23, which may also sometimes be referred to as a broadband remote access server (BRAS), a remote access server (RAS) or a broadband access server (BAS), provides access to the packet-switched network 14. Communication between the access multiplexer 21 and the NAS 23 can take place over the dedicated logical link 19 between these elements. The dedicated logical link 19, which may traverse an intervening access data network (not shown), can be implemented in various ways. For example, in one embodiment, the dedicated logical link 19 may be implemented as an asynchronous transfer mode (ATM) permanent virtual circuit (PVC). In another embodiment, the dedicated logical link 19 may be implemented as a virtual local area network (VLAN). It will be appreciated that various other implementations of the dedicated logical link 19 are possible.

The access multiplexer 21 allows data arriving from the NAS 23 along given ATM PVCs, VLANs or other dedicated logical links to be sent over corresponding physical links via corresponding one of its ports, and vice versa. Thus, the access multiplexer 21 can be said to implement a mapping 134 between, on the one hand, dedicated logical links and, on the other, ports of the access multiplexer 21. In this example, the mapping 134 implemented by the access multiplexer 21 relates the dedicated logical link 19 to the port 104 of the access multiplexer 21. In one example embodiment, the mapping 134 can be maintained by the access multiplexer 21.

In another example embodiment, the mapping 134 can be maintained by an operation support system (OSS) 122. The OSS 122 represents a collection of systems that perform management, inventory, engineering, planning, repair and other functions for a service provider. The OSS 122 may be connected to the NAS 23 via the service provider network 86. One of the functions of the OSS 122 may include management of network elements, assets and equipment. Thus, the OSS 122 maintains a mapping 124 between, on the one hand, ports of various access multiplexers or other network elements under control of the service provider and, on the other, service point locations of end user equipment (such as the end user equipment 12) connected to those ports. In this case, the mapping 124 maintained by the OSS 122 relates a port 104 of the network element 21 to a service point location, i.e., the location of a service point where the end user equipment 12 is located. As mentioned previously, this service point location may be expressed as a civic address, a geo location, or any other information identifying where the service point is located. In this specific example, it is assumed that the service point location is "15 Main Street".

Figure 6:
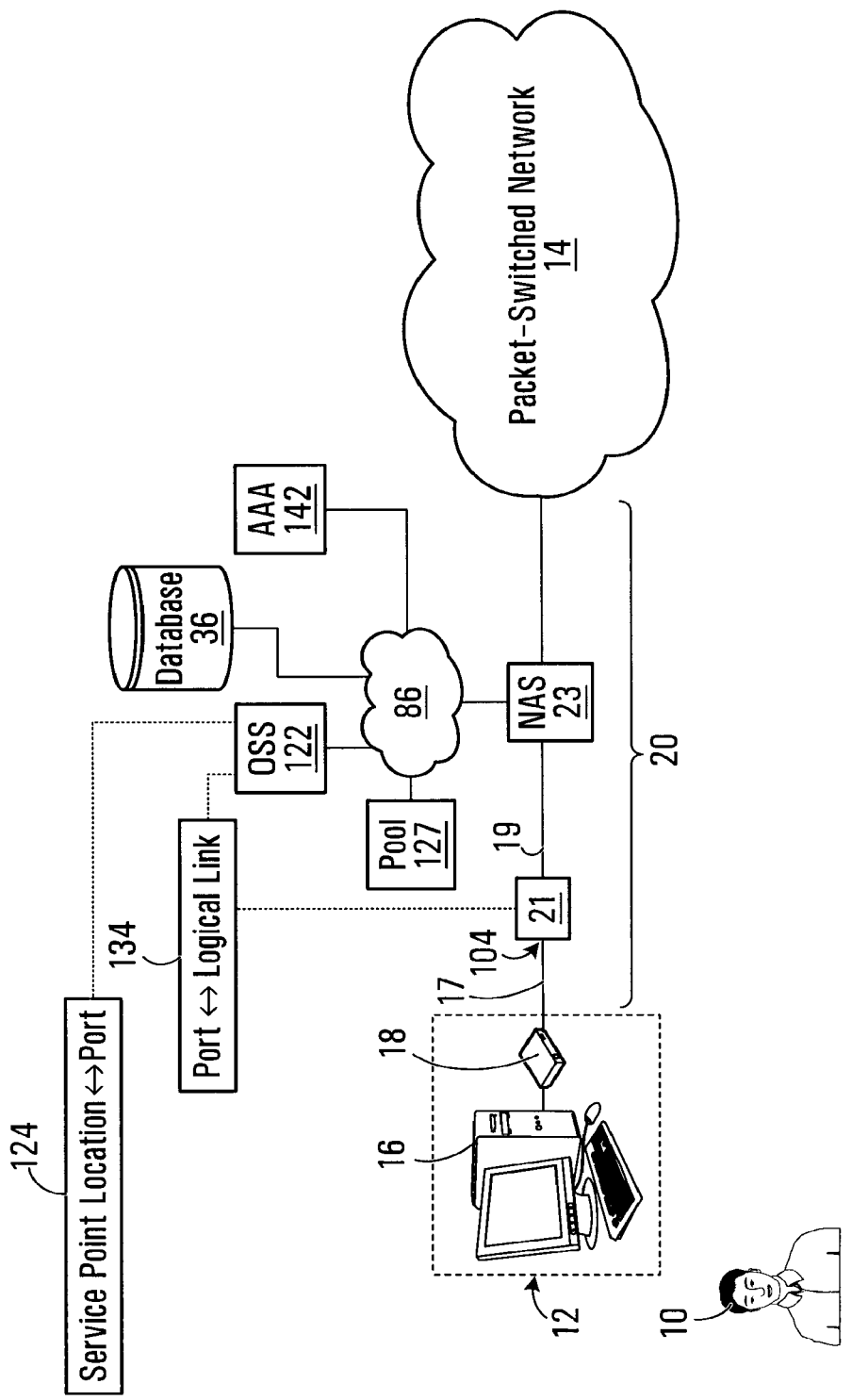
FIGS. 6-8 are block diagrams and flow diagrams illustrating the example creation of an association between logical identifiers assigned to end user equipment and respective service point locations for that end user equipment, such association being useful in the population of the database of FIG. 2A.

The infrastructure shown in FIG. 6 further comprises an authorization element 142, which can be connected to the NAS 23 via the service provider network 86. The nature of the connection between the NAS 23 and the authorization element 142 is immaterial. For example, in one embodiment, the authorization element 142 may be a server (e.g., an Authentication, Authorization, and Accounting (AAA) server) responsive to queries from the NAS 23. In such an embodiment, the authorization element 142 and the NAS 23 may communicate using the Remote Authentication Dial In User Service (RADIUS) protocol, a description of which is available at www.ietforg/rfc/rfc2865.txt. In another embodiment, the authorization element 142 may be a functional element integrated with the NAS 23.

In this example, the NAS 23 is operative to maintain a pool 127 of pre-allocated logical identifiers that can be used by various end user equipment, including the end user equipment 12. In some embodiments, the pool 127 of logical identifiers may be built up as a cooperative effort between the NAS 23 and the OSS 122, while in other embodiments, it may not be necessary for the OSS 122 to be involved in creating the pool 127 of logical identifiers. In still other embodiments, the pool 127 of logical identifiers may be maintained by the authorization element 142, and may be made accessible to the authorization element 142 without needing to pass through the NAS 23.

It will be appreciated that numerous modifications and variations of the infrastructure of FIG. 6 are possible. For example, in some embodiments, the access multiplexer 21 can be omitted. This may be true in embodiments where the end user equipment 12 implements a wireless access point. For instance, in such embodiments, the connection between the wireless access point and the NAS 23 may be provided by a dedicated point-to-point link. As another example, in some embodiments, instead of the dedicated logical link 19, there may be a shared link leading to the end user equipment 12.

Figure 7:
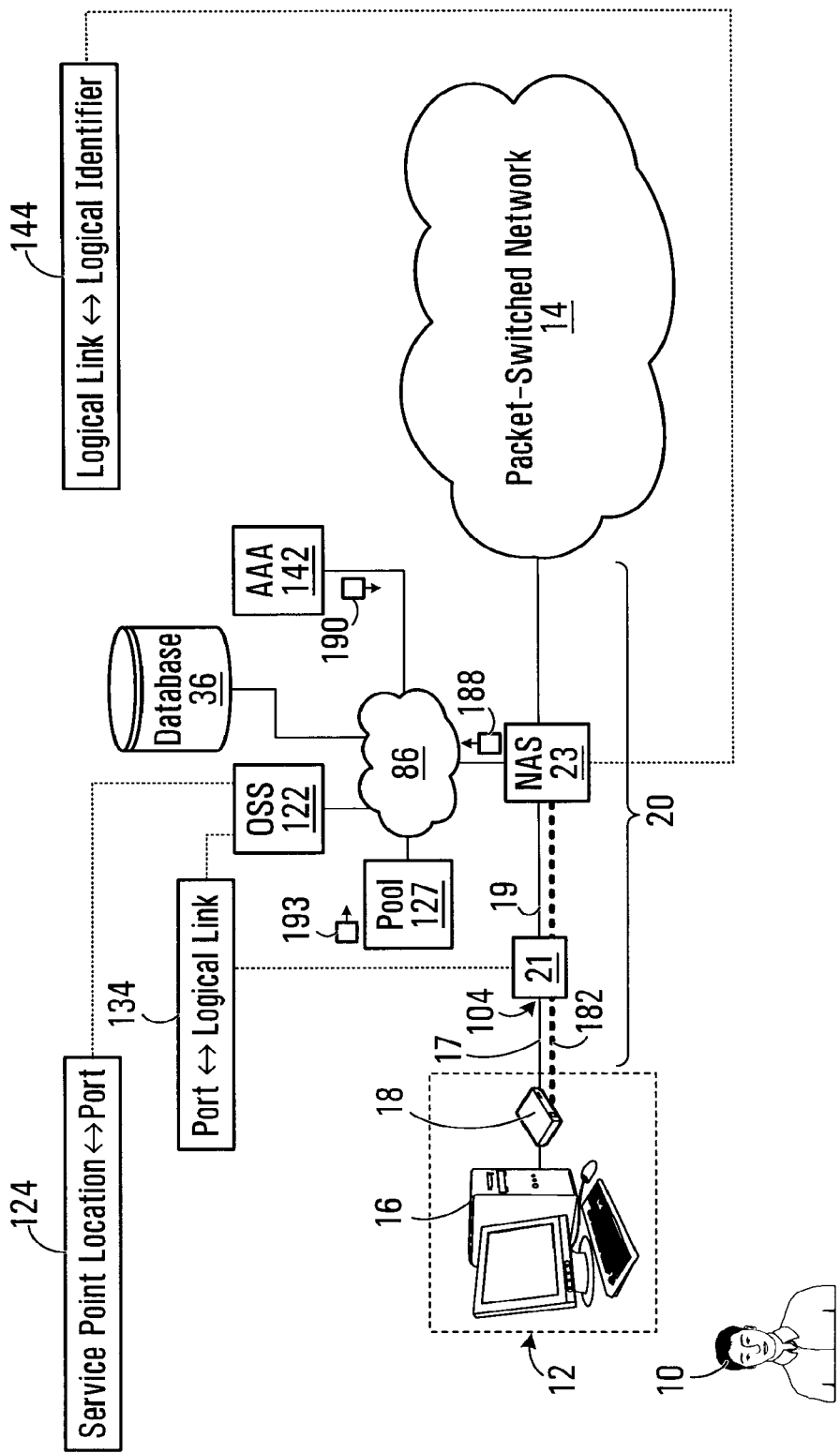

Reference is now made to FIG. 7, which illustrates an example of a possible event flow upon activation of the end user equipment 12, which may occur, for instance, as the network interface unit 18 and/or the computing device 16 of the end user equipment 12 is/are powered up. Thereafter:

a) the end user equipment 12 establishes physical layer connectivity with the access multiplexer 21 over the physical link 17;

b) this is followed by establishment of Ethernet connectivity between the end user equipment 12 and the access multiplexer 21;

c) the end user equipment 12 verifies its ability to communicate using Point-to-Point Protocol over Ethernet (PPPoE). For a more detailed explanation of PPPoE, one may refer to Internet Request For Comments (RFC) 2516, available from the Internet Engineering Task Force (http://www.ietf.org), hereby incorporated by reference herein;

d) next, assuming that the end user equipment 12 has the ability to communicate using PPoE, the end user equipment 12 verifies whether it should make a so-called "access request" automatically or in response to user input (which can be obtained via a software application). For purposes of this example, let it be assumed that conditions have been met such that the end user equipment 12 should make an access request;

e) the end user equipment 12 begins entry into PPPoE communication by broadcasting an "initiation" packet over the dedicated logical link 19;

f) the NAS 23 responds to receipt of the initiation packet by sending an "offer" packet to the end user equipment 12. At this stage, it can be said that a logical connection 182 has been defined between a first endpoint (the end user equipment 12) and a second endpoint (the NAS 23);

g) following receipt of the offer packet, the end user equipment 12 sends an access request 184 to the NAS 23 with the ultimate goal of accessing the packet-switched network 14. The access request 184 may comprise credentials that can be hard coded or programmably installed on the end user equipment 12. Alternatively, the credentials may be entered by the user 10 of the end user equipment 12.

h) upon receipt of the access request 184 containing the credentials along the dedicated logical link 19, the NAS 23 executes an authorization procedure as follows. The NAS 23 communicates the credentials to the authorization element 142, e.g., via a RADIUS Access-Request message 188. In response to receipt of the credentials from the NAS 23, the authorization element 142 determines whether the credentials allow access to the packet-switched network 14. For example, this can be determined by consulting a database (not shown) of credentials for various subscribers. If the credentials allow access to the packet-switched network 14, the authorization element 142 returns an acceptance message (e.g., a RADIUS Access-Accept message). On the other hand, if the credentials do not allow access to the packet-switched network 14, the authorization element 142 returns a refusal message (e.g., a RADIUS Access-Reject message). For purposes of this example, assume that the credentials allow access to the packet-switched network 14, resulting in issuance of an acceptance message 190. In this example, two alternatives are possible alternative 1 (where the pool 127 of logical identifiers is maintained by the authorization element 142): the authorization element 142 obtains a logical identifier 193 from the pool 127 of logical identifiers that is maintained by the authorization element 142. The logical identifier 193 is sent to the NAS 23, which assigns the logical identifier 193 to the dedicated logical link 19;

alternative 2 (where the pool 127 of logical identifiers is maintained by the NAS 23): responsive to receipt of the acceptance message 190 from the authorization element 142, the NAS 23 obtains a logical identifier 193 from the pool 127 of logical identifiers that is maintained by the NAS 23. The logical identifier 193 so obtained is assigned by the NAS 23 to the dedicated logical link 19.

i) the NAS 23 sends a "confirmation" packet back to the end user equipment 12, thus completing establishment of a PPPoE session between the endpoints of the logical connection 182;

j) additional hand-shaking may be performed between the end user equipment 12 and the NAS 23 in order to establish a Point-to-Point Protocol (PPP) session between the endpoints of the logical connection 182;

k) following this, further hand-shaking may be undertaken between the end user equipment 12 and the NAS 23 in order to establish an Internet Protocol Control Protocol (IPCP) session between the endpoints of the logical connection 182.

l) during the IPCP session, the NAS 23 releases the logical identifier 193 towards the end user equipment 12 that issued the access request 184, in order to allow the end user equipment 12 to identify itself using the logical identifier 193 in future communications over the dedicated logical link 19. Since the dedicated logical link 19 to which has been assigned the logical identifier 193 leads to the end user equipment 12 and since the end user equipment 12 will identify itself using the logical identifier 193 in future communications, it can be said that the logical identifier 193 is in actuality assigned to the end user equipment 12.

It can thus be appreciated that once the logical identifier 193 has been obtained from the pool 127 of logical identifiers (either by the NAS 23 or by the authorization element 142), the NAS 23 assigns the logical identifier 193 to the dedicated logical link 19.

In an embodiment where the database 36 is integrated with or connected directly to the NAS 23, the fact that the NAS 23 assigns the logical identifier 193 to the dedicated logical link 19 allows the NAS 23 to construct and maintain a mapping 144 between, on the one hand, various dedicated logical links (such as the dedicated logical link 19 and others) and, on the other, logical identifiers corresponding to those dedicated logical links.

In an embodiment where database 36 is integrated with or connected directly to the authorization element 142, the logical identifier 193 and the identity of the dedicated logical link 193 to which it is assigned are sent back by the NAS 23 to the authorization element 142, and it is the authorization element 142 that maintains the aforementioned mapping 144 between dedicated logical links and logical identifiers corresponding to those dedicated logical links.

Of course, those skilled in the art will be able to think of other ways of causing the end user equipment 12 to send the access request 184 over the logical connection 182 between the end user equipment 12 and the NAS 23, as well as other ways of assigning a logical identifier to the dedicated logical link 19. It should further be mentioned that, in some cases, the establishment of the aforementioned PPPoE, PPP and/or IPCP sessions may not be required. This is particularly the case where the dedicated logical link 19 is a VLAN.

In view of the preceding description, and in particular given the previously described mappings 124, 134 maintained in the OSS 122 and/or the access multiplexer 21 and the previously described mapping 144 maintained in the NAS 23 or the authorization element 142, the following describes how one can create an association between logical identifiers and service point locations.

Figure 8:
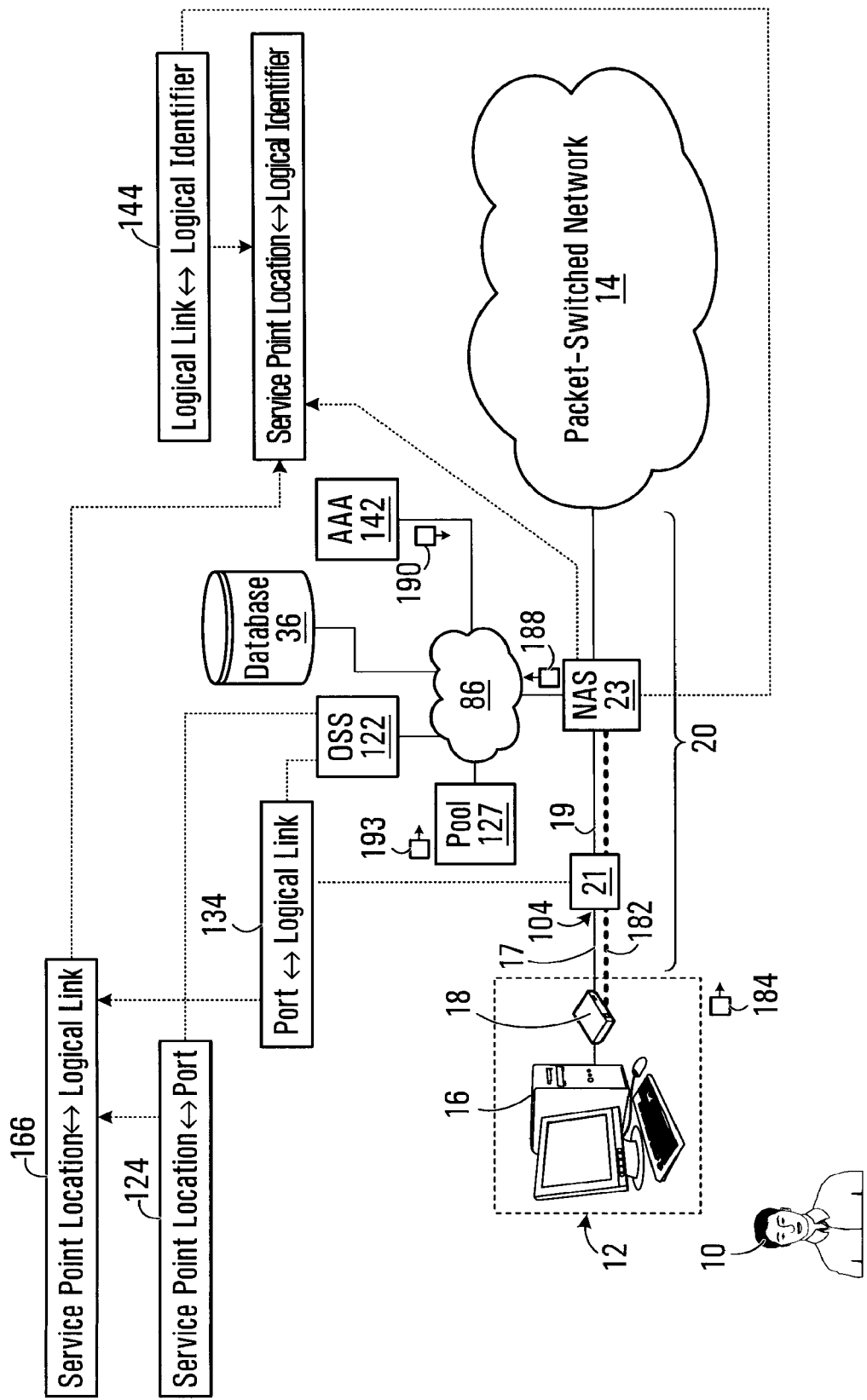

Specifically, with reference to FIG. 8, by combining the mapping 124 with the mapping 134, the OSS 122 can create an intermediate mapping 166 between, on the one hand, dedicated logical links and, on the other hand, service point locations of end user equipment having logical connections with the NAS 23 which traverse those dedicated logical links. In this example, the intermediate mapping 166 would associate the dedicated logical link 19 to the service point location of the end user equipment 12. In one embodiment, the OSS 122 transmits the intermediate mapping 166 to the database 36 (or a server associated therewith).

At the database 36 (or a server associated therewith), the intermediate mapping 166 received from the OSS 122 may be combined with the aforementioned mapping 144 (received from the NAS 23 or the authorization element 142), thus creating a final mapping 176 between, on the one hand, logical identifiers (such as IP addresses) and, on the other, service point locations of end user equipment having logical connections with the NAS 23 which traverse respective dedicated logical links to which those logical identifiers have been assigned. In this example, the final mapping 176 would specify that the logical identifier 193 corresponds to the service point location of the end user equipment 12. This is precisely the type of association that is useful to store in the database 36.

It will also be appreciated that in embodiments where logical identifiers are dynamically assigned to various end user equipment 12 (e.g., in a dynamic IP address system), the database 36 may be updated accordingly.

From the above, it should be apparent that the database 36 can be populated with logical identifiers (such as IP addresses) and service point locations associated with those logical identifiers. More generally, the database 36 can be populated with records for various logical identifiers, each record containing location information. The location information that can be contained in the record for a given logical identifier may be indicative of where the end user equipment to which the given logical identifier was assigned was located when access to the packet-switched network 14 was sought.

While the above-described example illustrates one possible technique for populating a portion of the database 36, it will be appreciated that different techniques may be employed in different embodiments.

Although the above-described example relates to an online transaction involving an online purchase using a credit card, it will be recognized that principles described herein apply to other types of online transactions, including, for example, those involving online purchases or payments using other payment objects (e.g., digital cash, electronic checks), online fund transfers involving accounts (e.g., bank accounts, online wallet accounts), attempts to access secure online content; and attempts to access a virtual private network, to name a few non-limiting possibilities.

It should further be appreciated that although the above references to online transactions have involved the computing device 16 effecting an online transaction with a merchant site over the packet-switched network 14, it is also within the scope of the invention for the computing device 16 to be implemented as a communication device which is one party to a call and which effects an online transaction with another party reachable over the packet-switched network 14. Specifically, the communication device could be embodied as a VoIP phone, a Plain Old Telephone Service (POTS) phone equipped with an analog terminal adapter (ATA), or a soft phone (i.e., a computer equipped with telephony software). For its part, one party to the call can be a purveyor of goods or services.

It should further be appreciated that any one or more of the above described messages 102, 104, 106, 108, 114, 116, 118, 120, 121 may be encrypted prior to being transmitted. This encryption may be effected using the SSL protocol or some other suitable encryption technique, without limitation.

Those skilled in the art will also appreciate that, in some embodiments, certain functionality of a given component described herein (e.g., the transaction validation server 51, the server 70, the payment gateway 60, the transaction management server 80, the servers $30_1 \ldots 30_N$) may be implemented as pre-programmed hardware or firmware elements (e.g., application specific integrated circuits (ASICs), electrically erasable programmable read-only memories (EEPROMs), etc.) or other related elements. In other embodiments, the given component may comprise a processor having access to a code memory which stores program instructions for operation of the processor to implement functionality of that given component. The program instructions may be stored on a medium which is fixed, tangible, and readable directly by the given component (e.g., removable diskette, CD-ROM, ROM, fixed disk, USB key, etc.). Alternatively, the program instructions may be stored remotely but transmittable to the given component via a modem or other interface device connected to a network over a transmission medium. The transmission medium may be either a tangible medium (e.g., optical or analog communications lines) or a medium implemented using wireless techniques (e.g., RF, microwave, infrared or other wireless transmission schemes).

Although various embodiments of the present invention have been described and illustrated, it will be apparent to those skilled in the art that numerous modifications and variations can be made without departing from the scope of the invention, which is defined in the appended claims.

What is claimed is:

1. A system for maintaining forensic information for online transactions, the system comprising:
   an access multiplexor comprising a plurality of physical ports each connected to a respective one of a plurality of physical links, each of the physical links terminating at a known physical location for connecting the first network element to respective user equipment located at the known physical location;
   a network access server communicatively coupled to the access multiplexor by a plurality of logical link each associated with a respective one of the plurality of physical ports of the access multiplexor, a respective one of a plurality of logical identifier assigned to each of the logical links, wherein the logical identifier comprises an IP address;
   generating and storing a location information database linking logical identifiers and known physical locations by combining mappings between:
      known physical locations: physical ports maintained by the access multiplexor;
      physical ports: logical links maintained by the access multiplexor; and
      logical links: logical identifiers maintained by the network access server;
   a transaction management maintaining a transaction record database by:
      receiving from a merchant server a transaction message comprising:
         a transaction identifier identifying an online transaction that was attempted to be completed from end user equipment; and
         a logical identifier comprising an IP address used for communicating with the end user equipment from which the online transaction was attempted;
      using the logical identifier received in the transaction message to look-up in the location information database physical location information currently linked to the logical identifier;
      storing in the transaction record database a new transaction record comprising:
         the transaction identifier received from the merchant server in the transaction message; and
         the physical location information from the look-up in the location information database.

2. The system of claim 1, further comprising the merchant server, the merchant server configured for:
   receiving a transaction request from the user equipment for the transaction;
   transmitting a payment request for the requested transaction to a payment gateway server;
   receiving a transaction approval message from the payment gateway server, the transaction approval message comprising:
      the transaction identifier;
      an approval or denial for the transaction; and
      sending the transaction message to the transaction management entity.

3. The system of claim 2, wherein the merchant server is further configured for:
   storing a record of the transaction approval message in a merchant's transaction database.

4. The system of claim 1, wherein the transaction management entity is further configured to:
   receive investigative queries comprising a query transaction identifier;
   retrieve physical location information stored in the location information database in association with the transaction identifier; and
   return the retrieved physical location in response to the received investigative query.

5. The system of claim 1, wherein the IP address is assigned to the end user equipment in response to the end user equipment requesting access with the service provider to the packet-switched network.

6. The system of claim 1, wherein the transaction identifier is a unique transaction identifier generated by an entity that is a member of a financial network.

7. The system of claim 1, wherein the online transaction involves at least one of an attempt to make a payment and an attempt to effect a fund transfer.

8. The system of claim 1, wherein the online transaction involves at least one of an attempt to access secure online content and an attempt to access a virtual private network.

* * * * *